May 26, 1925.
J. N. ERLANDSEN
HOOK
Filed May 5, 1924
1,539,551
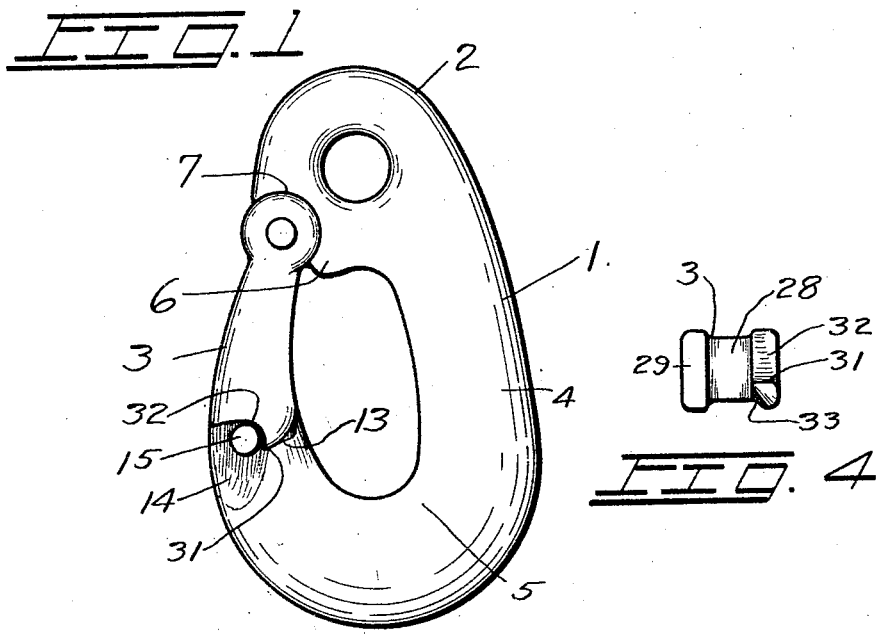
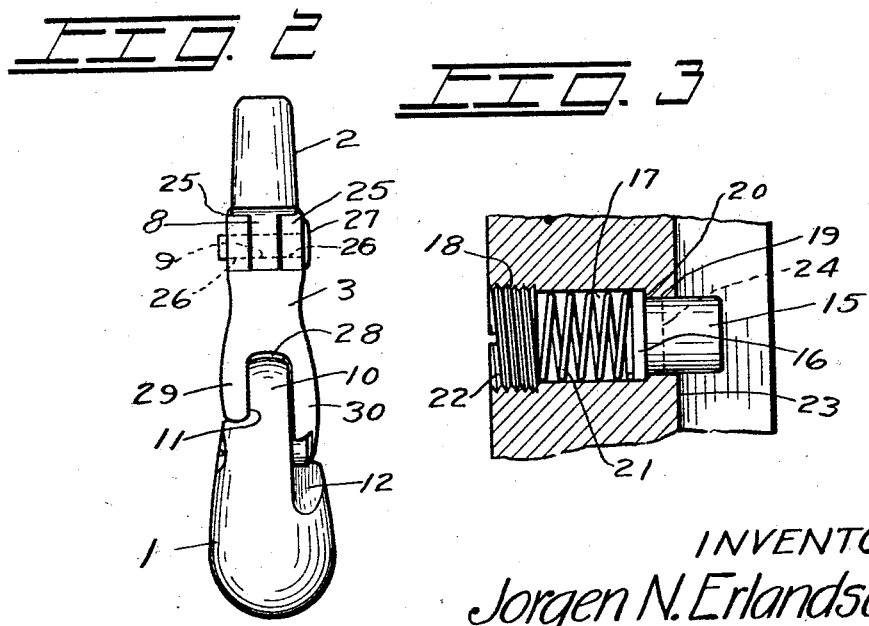
INVENTOR
Jorgen N. Erlandsen
Harry Bowen
ATTORNEY Patented May 26, 1925.

1,539,551

UNITED STATES PATENT OFFICE.

JORGEN N. ERLANDSEN, OF EVERETT, WASHINGTON.

HOOK.

Application filed May 5, 1924. Serial No. 711,083.

*To all whom it may concern:*

Be it known that I, JORGEN N. ERLANDSEN, a citizen of the United States, residing at Everett, in the county of Snohomish and State of Washington, have invented a new and useful Hook; and I hereby declare that the following is a full, clear, and exact specification, such as will enable others skilled in the art to which it appertains to make and use the same.

The invention is the providing of a lock hook with a symmetrical outline and in which the elements are embodied within the surface of the hook.

The object of the invention is to provide a lock hook which is of a simple and economical design and in which the elements do not project beyond the surface of the hook.

Another object of the invention is to provide a lock hook in which the locking dog is pivotally attached to the side of the eye of the hook by placing a slot through the eye of the dog and placing this over a web in the eye of the hook.

And a further object of the invention is to provide a lock hook in which the locking dog appears to be an extension of the point of the hook.

And a still further object of the invention is to provide a lock hook in which the locking dog is held by a spring pin which will automatically lock as the dog is placed in a closed position.

With these ends in view the invention embodies a lock hook having a locking dog pivotally attached to the side of the eye with a dove-tailed joint and which locks over the point of the hook with a spring pin and also with a dove-tailed joint.

Other features and advantages of the invention will be seen from the following description taken in connection with the drawings, wherein:—

Figure 1 is a side view of the hook.

Figure 2 is a side view looking toward the locking dog.

Figure 3 is a cross section through the spring pin.

Figure 4 is a detail looking toward the end of the locking dog.

In the drawings I have shown my hook as it would be constructed wherein numeral 1 indicates the body of the hook, numeral 2 the eye, and numeral 3 the locking dog.

The hook may be of any suitable size or shape but the design shown with a normally straight section 4 and a small curve at the point 5 is preferable. The eye 2 is provided with a slight projection 6 in which is a recess 7 which has a web 8 with a hole 9 through it in its center; and the point of the hook is provided with a flat portion 10 at the center and recesses 11 and 12 at the sides. The recess 12 will be shaped as shown in Figure 1 with a tapering surface as shown at the point 13 which will engage and hold the locking dog 3 and an opening 14 into which the thumb or finger may be inserted when it is desired to open the hook.

The point of the hook is provided with a locking spring pin 15 which has a head 16 and which is held in an opening 17 in the hook. The opening 17 is provided with a threaded portion 18 and has another small opening 19 at the opposite end through which the pin projects. The head 16 of the pin is normally held against a shoulder 20 at the end of the opening 17 by a spring 21 which is held in place by a screw plug 22. It will be seen that the pin 15 may first be placed in the opening 17 through the threaded end and then the spring may be placed against the head of the pin and held in place by the plug 22. It will also be seen that the pin 15 may be pushed inward until its outer end is inside of the surface 23 or to a point indicated by the dotted line 24.

The locking dog 3 is provided with ears 25 at its inner end which fit over the web 8 and into the recess 7. These ears are provided with openings 26 through which a pin 27 may be placed to hold them in place. The opposite end of the dog 3 is provided with a slot 28 on one side of which is a projection 29 and in the other side of which is a projection 30. The projection 29 is of a rectangular shape and fits into the recess 11 at the point of the hook. The projection 30 is similar to the projection 29 and somewhat longer and is provided with a point 31 at its lower extremity and a curved recess 32 adjacent the point into which the pin 15 will snap as the dog arrives at the position shown in Figure 1. The inner surface of the point 31 is beveled as shown at the point 33 in Figure 4 so that as the point passes over the end of the pin it will force it inward until the edge of the recess 32 passes over the pin and arrives at the position shown in Figure 1, so that the hook will lock automatically.

It will be understood that changes may be made in the construction without departing from the spirit of the invention. One of which changes may be in the exact location of the point at which the locking dog is pivoted; another may be in the design of the locking dog; and still another may be in the design of the spring pin or in the arrangement of the resilient means for holding it outward.

The construction will be readily understood from the foregoing description. To use the device it may be attached in any suitable rigging in which a lock hook is desirable and it will be seen that as the shackle, cable, or the like is placed in the hook the locking dog may be moved downward to the position shown in Figure 1 so that it will positively prevent the device from coming out of the hook. It will also be seen that the hook may be opened by pressing the spring pin inward and closed automatically as hereinbefore described.

Having thus fully described the invention, what I claim as new and desire to secure by Letters Patent, is:—

1. In a hook, a latch pivotally attached to the side of its eye, a tongue projecting from the point, and a spring pin for holding the latch into engagement with the tongue, said latch having a slot in its outer end that slides over the tongue.

2. A hook having a latch with a slot in its outer end, pivotally attached to its eye, a projection at the point of the hook, and a spring pin in the point of the hook for engaging the latch.

3. In a hook, a latch with a slot in its outer end, pivotally attached to a projection at the side of the eye of the hook, a tongue at the point of the hook which fits into the slot in the latch, and a spring pin in the point which engages the latch.

JORGEN N. ERLANDSEN.